(12) United States Patent
Lindner et al.

(10) Patent No.: US 8,801,424 B2
(45) Date of Patent: Aug. 12, 2014

(54) DEVICE FOR EXPANDING HOLLOW BODIES

(75) Inventors: Knut Lindner, Kelkheim (DE); Thoralf Krause, Leipzig (DE); Arnd Greding, Hofheim (DE)

(73) Assignee: Rothenberger AG, Kelkheim (DE)

( * ) Notice: Subject to any disclaimer, the term of this patent is extended or adjusted under 35 U.S.C. 154(b) by 269 days.

(21) Appl. No.: 13/496,909

(22) PCT Filed: Aug. 28, 2010

(86) PCT No.: PCT/EP2010/005299
§ 371 (c)(1),
(2), (4) Date: Mar. 19, 2012

(87) PCT Pub. No.: WO2011/035840
PCT Pub. Date: Mar. 31, 2011

(65) Prior Publication Data
US 2012/0181727 A1    Jul. 19, 2012

(30) Foreign Application Priority Data
Sep. 23, 2009   (DE) .................. 10 2009 042 719
Jan. 13, 2010   (DE) .................. 10 2010 004 426

(51) Int. Cl.
*A01J 21/00*   (2006.01)

(52) U.S. Cl.
USPC ........... 425/393; 425/383; 425/392; 264/320; 264/296

(58) Field of Classification Search
CPC ........ B29C 57/00; B29C 57/02; B29C 57/04; B29C 57/06; B29C 57/08; B21D 41/00; B21D 41/02; B21D 41/021

USPC .................. 425/383, 392, 393; 264/320, 296
See application file for complete search history.

(56) References Cited

U.S. PATENT DOCUMENTS 2,943,667 A * 7/1960 Ewing et al. .................. 72/20.2
3,267,560 A * 8/1966 Rejeski ...................... 29/890.15
(Continued)

FOREIGN PATENT DOCUMENTS

DE        221936 A1    5/1985
DE       4339993 C1    1/1995
(Continued)

OTHER PUBLICATIONS

German encyclopedia "Grosse Brockhaus", 1983, p. 138.
(Continued)

*Primary Examiner* — Timothy Kennedy
*Assistant Examiner* — David N Brown, II
(74) *Attorney, Agent, or Firm* — Leydig, Voit & Mayer, Ltd.

(57) ABSTRACT

A device for expanding a hollow body includes a plurality of sector-shaped expandable jaws disposed in a holder and distributed about a central axis. The expandable jaws extend along the axis to a free end and are radially movable with respect to the axis. Each of the expandable jaws includes: a cylindrical surface having a radius corresponding to a radius of the expanded hollow body and an inward radial taper at an area of the free end; and a plurality of projections and recesses disposed in a joint region and arranged in an alternating manner with each other along the axis and at least partially extending into the area of the free end. The cylindrical surfaces are rounded off to transition to respective outer surfaces of the projections. The outer surfaces of the projections extend, at least at ends of the projections, radially inward with respect the cylindrical surfaces.

8 Claims, 2 Drawing Sheets

(56) References Cited

U.S. PATENT DOCUMENTS

| | | |
|---|---|---|
| 5,744,085 A | 4/1998 | Soerberg |
| 2008/0196468 A1* | 8/2008 | Tanner et al. ................. 72/112 |

FOREIGN PATENT DOCUMENTS

| | | |
|---|---|---|
| DE | 69414721 T2 | 5/1999 |
| DE | 19924695 A1 | 11/2000 |
| EP | 0718057 A1 | 6/1996 |
| EP | 0725908 B1 | 11/1998 |
| EP | 2090384 A2 | 8/2009 |

OTHER PUBLICATIONS

European Patent Office, International Search Report in International Patent Application No. PCT/EP2010/005299 (Mar. 23, 2011).

* cited by examiner

DEVICE FOR EXPANDING HOLLOW BODIES

CROSS-REFERENCE TO PRIOR APPLICATIONS

This application is a U.S. National Phase application under 35 U.S.C. §371 of International Application No. PCT/EP2010/005299, filed on Aug. 28, 2010, and claims benefit to German Patent Application No. DE 10 2009 042 719.8, filed on Sep. 23, 2009, and German Patent Application No. DE 10 2010 004 426.1, filed on Jan. 13, 2010, the entire contents of each of these applications being hereby incorporated by reference herein. The International Application was published in German on Mar. 31, 2011 as WO 2011/035840 under PCT Article 21(2).

FIELD

The invention relates to a device for expanding hollow bodies, in particular pipe ends.

BACKGROUND

Such devices are also referred to as "expanders" or expander heads, and they serve, among other things, as tools for use in plumbing. The device can be driven by hand, for example, by a manual lever, or else by a motor using threaded spindles, or by hydraulic machines.

European patent specification EP 0 725 908 B1 and the corresponding translation of the European patent DE 694 14 721 T2 describe that, when plastic pipes are expanded in order to create pipe connections, conditions other than in the case of expanding metal pipes have to be additionally observed. Plastic pipes, especially those made of crosslinked polyolefins, including crosslinked polyethylene, have a so-called shape memory, which is also referred to as the memory effect. This means that, after the pipes have been expanded, they contract again over the course of time, so that appropriate working speeds have to be employed. Moreover, the walls of plastic pipes are much thicker than those of metal pipes of the same diameter, so that the radial expansion has to correspond at least to these wall thicknesses.

On the basis of these considerations and before the backdrop of preventing sharp-edged impressions caused by the edges of the expandable jaws—which would lead to leaks in the later pipe connections—the above-mentioned documents propose carrying out the expansion in several stages, returning the expandable jaws to the starting position after each stage, and then pushing them deeper into the end of the pipe and repeating or continuing the expansion several times. In this process, the stages should be radially much smaller than the wall thickness of the pipes. The radial movement is made by an expansion mandrel having a slender conical surface that is pushed into a set of, for instance, six expandable jaws. These expandable jaws each have two outer cylindrical surfaces between each of which there is a conical surface in the axial direction, and these match the surface geometries of the expanded jaw position. The outsides of the conical surfaces can also be provided with fine teeth.

On the one hand, this makes it possible to select the circumferential surfaces of the jaw sectors to be larger although at the expense of the gap widths between the jaws, but on the other hand, this design requires multiple tool actuations for each pipe connection and this—also because of having to shake the tool loose—is time-consuming and tiring for the operator in view of the force needed, as well as because of the weight of the tool. Furthermore, the expanded pipe end also retains its funnel shape, even when it is being pushed over the last cylindrical surface, as a result of which the guiding properties of the pipe end are partially lost.

East German patent application DD 221 936 A1 and German patent DE 43 39 993 C1 describe, for tools with a one-stage expansion, to arrange alternating projections and recesses in the joints between the expandable jaws in the axial direction in order to lessen the collapsing of the wall of the hollow body as the radial movement of the expandable jaws increases. Here, it is kept in mind that the outer surfaces of the expandable jaws, the so-called working surfaces, should be in the radial final position in a cylindrical surface. However, it has been found that this effect is accompanied by undesired deformations. Therefore, German patent specification DE 43 39 993 C1 proposes beveling the ends of the projections vis-à-vis the partially cylindrical working surfaces towards the inside in such a way that, in the contracted state of the expandable jaws, the outer surfaces of the projections do not project very much beyond the cylindrical partial surfaces that are defined by the working surfaces.

However, it has been determined in the present invention that, at the beginning of the expansion, the edges formed between the cylindrical surfaces and the bevels leave behind sharp impressions that cannot be made to disappear completely during the course of the further expansion. The cause of this can be assumed to be that the edges cause bending and thus a greater flow of the material, as a result of which the strength of the material is increased excessively locally and this can no longer be compensated for when the expansion is continued. This effect is referred to in metallurgy as cold hardening (see German encyclopedia "Grosse Brockhaus", 1983, p. 138). As a result, the connection sites of the pipe ends are not tight, and this leads to leaks.

European patent application EP 0 718 057 A2 describes breaking or rounding off the axis-parallel lengthwise edges as well as the circular sector-shaped front edges of the expandable jaws, specifically with a maximum radius of 2.0 mm. However, in actual practice, it has been determined in the present invention that such rounding off of the front edges is not sufficient to prevent brittle fractures of the plastic pipes under mechanical stress, be it due to the expansion while pipe sections are being joined, due to deformations of the pipe during installation, or due to high internal pressures such as those encountered in water pipes used for drinking water or heating.

SUMMARY

In an embodiment, the present invention provides a device for expanding a hollow body including a plurality of sector-shaped expandable jaws disposed in a holder and distributed about a central axis. The expandable jaws extend along the axis to a free end and are radially movable with respect to the axis. Each of the expandable jaws includes a cylindrical surface having a radius corresponding to a radius of the hollow body in an expanded state of the hollow body and a cutout from the cylindrical surface so as to form an inward radial taper at an area of the free end. Each of the expandable jaws further includes a plurality of projections and recesses disposed in a joint region between respective ones of the expandable jaws, the projections and recesses being arranged in an alternating manner with each other along the axis and at least partially extending into the area of the free end. The cylindrical surfaces are rounded off so as to transition to respective outer surfaces of the projections. The outer surfaces of the projections extend, at least at ends of the projections, radially inward with respect the cylindrical surfaces.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

DETAILED DESCRIPTION

Figure 1:
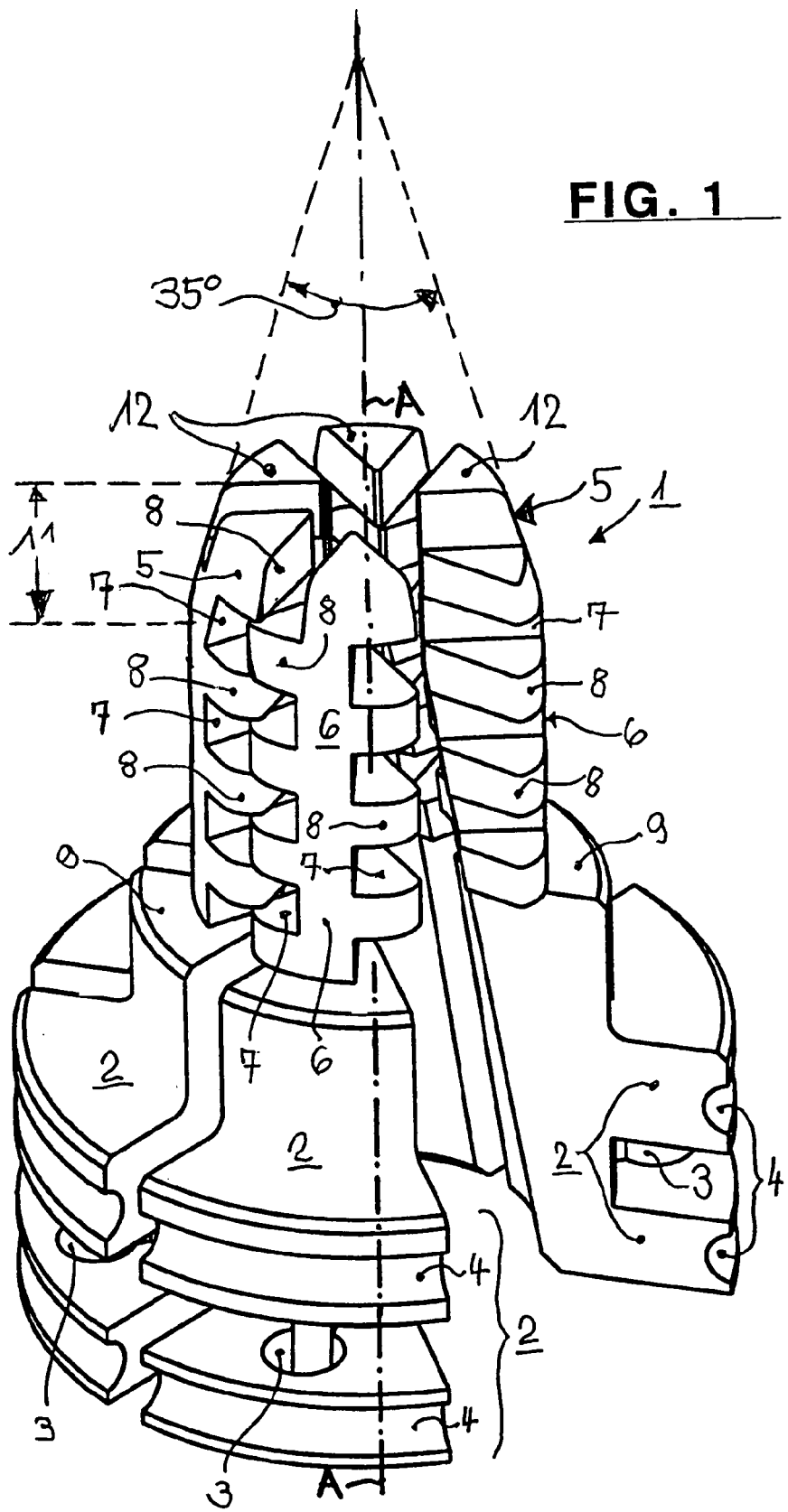
FIG. 1 shows a perspective view of five expandable jaws of an expansion head in the expanded state.

In an embodiment, the present invention provides an expansion device and an operating method for plastic pipes with which it is possible to carry out one-stage pressure-resistant expansions with large radial paths over the entire connection length of two pipe ends in a single work step, while retaining a constant cross section, and nevertheless preventing the formation of sharp-edged impressions in the expanded pipe ends, which are the cause of leaks.

In an embodiment, the present invention provides a device for expanding hollow bodies, in particular pipe ends, comprising several sector-shaped expandable jaws that are arranged in a holder so as to be distributed around an axis "A-A" and that can be moved radially thereto, and also having cutouts that have been cut from cylindrical surfaces whose radii correspond to the radii of the expanded hollow body, wherein projections and recesses are arranged alternately in the joints between the expandable jaws, and wherein the outer surfaces of the projections extend radially inward relative to the cylindrical surfaces, at least at their ends.

The device according to an embodiment of the invention advantageously provides that:
a) the cylindrical surfaces are rounded off so as to make a transition to the outer surfaces of the projections,
b) the expandable jaws are configured so as to taper radially inwards in the area of their free ends, and
c) the recesses and the projections continue in the area that is tapered radially inwards.

Consequently, in an embodiment, the invention provides an expansion device and an operating method for plastic pipes with which it is possible to carry out one-stage, pressure-resistant expansions with large radial paths over the entire connection length of two pipe ends in a single work step while retaining a constant cross section, and nevertheless preventing the formation of sharp-edged impressions in the expanded pipe ends, which are the cause of leaks. Here, it is advantageous that the expandable jaws are configured so as to taper radially inwards in the area of their free ends, and that the recesses and the projections continue in the area that is tapered radially inwards. This means that the plastic deformation of the pipe in the transition area between the original pipe diameter and the expanded pipe diameter is distributed over a fairly long section, so as to prevent punctually occurring, triaxial deformations with strong embrittlement effects.

Within the scope of additional embodiments of the invention, it is especially advantageous if—either individually or in combination:
- on the one hand, the area that tapers radially inwards on the circumference makes an edge-free transition to the cylindrical surfaces and, on the other hand, it is configured so as to be rounded off with respect to the front surfaces,
- the outer surfaces of the area that tapers inwards are situated at the end of the expansion stroke in a conical enveloping surface,
- the opening angle of the conical enveloping surface is between 30° and 45°,
- the length of the area that tapers inwards is between 3 mm and 30 mm, and/or
- the radius of curvature is at least 1 mm at the transition sites between the cylindrical surfaces and the outer surfaces of the projections.

In FIG. 1, for the sake of greater clarity, the connection nut for the attachment to a drive tool has been left out, and so has one of the expandable jaws 1 which, in the conventional manner, is mounted in the connection nut by means of guide pins and which has radial slots in which the guide pins can be moved. For this purpose, the flange sectors 2 have axis-parallel bores 3. Tension springs are placed into sections of circumferential grooves 4. Furthermore, an expansion mandrel belongs to the drive and, depending on the geometry of the complementary sliding surfaces on the insides of the expandable jaws 1, can have a conical or pyramidal surface coaxial to an axis "A-A".

Figure 2:
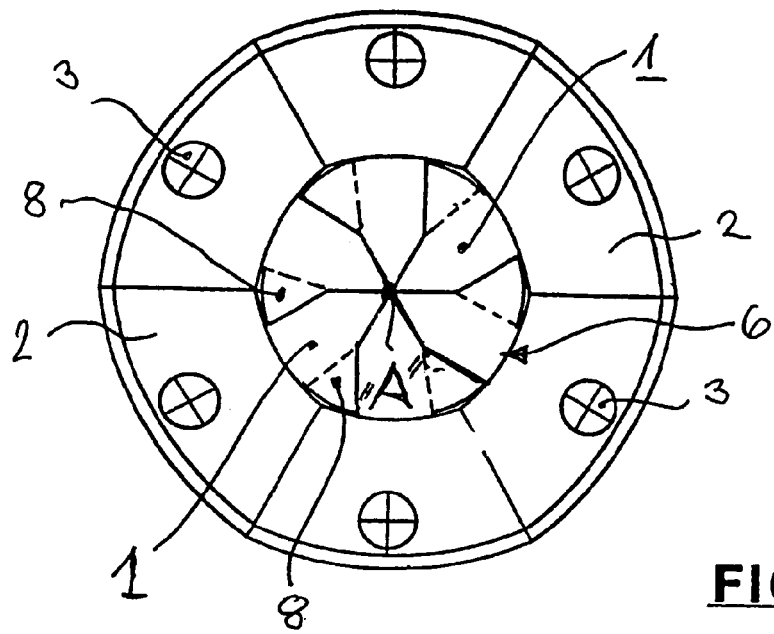
FIG. 2 shows an axial top view of six expandable jaws in the contracted state.
Figure 3:
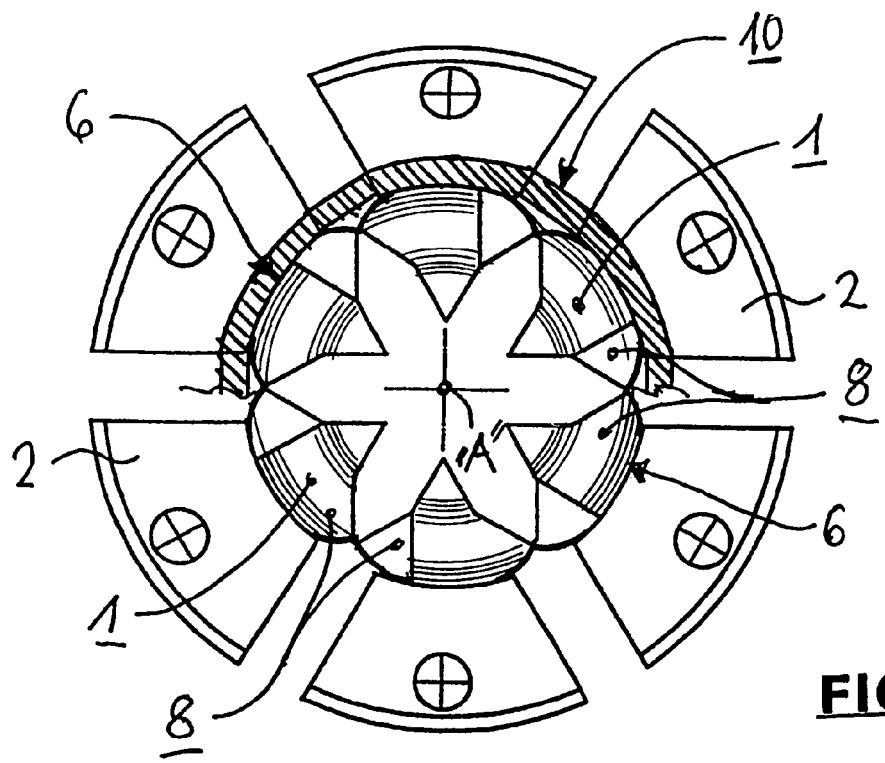
FIG. 3 shows an axial top view of the object of FIG. 2 with the six expandable jaws in the predetermined final position at the end of an expansion procedure for a pipe.

Extending away from each flange sector 2 and parallel to the axis "A-A" (as shown in FIGS. 1-3, a central axis of the device about which the expandable jaws 1 are concentrically arranged), there is a protrusion 5 with a cutout that has been cut from a cylindrical surface 6 whose radius corresponds to the prescribed inner radius of the expanded hollow body 10. This position is shown in FIG. 3. Recesses 7 extend into the cylindrical surfaces 6 from both sides, and they alternate with projections 8 in the direction of the axis "A-A," which as shown in FIGS. 1-3 is an axial direction of the device. As shown especially in FIG. 1, the recesses 7 and the projections 8 are arranged offset relative to each other on both sides of the expandable jaws 1 or of the cylindrical surfaces 6 and are dimensioned in such a way that all of the expandable jaws 1 are shaped identically and intermesh so that only one type of expandable jaws 1 is needed for each size. Between the cylindrical surfaces 6 and the flange sectors 2, there are also stop surfaces 9 for the end surfaces of the hollow bodies 10 that are to be expanded.

As FIGS. 1 through 3 show, the cylindrical surfaces 6 still extend over the partial length of the projections 8 with the same radius. Then, however, there is a reduction of the radius of curvature so that the ends of the projections 8 are radially further towards the inside than the cylindrical surfaces 6. As FIGS. 2 and 3 show, consequently neither in the closed state of the expandable jaws 1 (FIG. 2) nor in the widest open state (FIG. 3) does this give rise to protruding edges that could leave permanent impressions and sharp-edged and hardened bent areas due to pronounced flowing of the material in the substance of which the hollow body 10 is made. This material is then essentially only exposed to stress from tangential flow.

FIG. 1 also shows that the free ends of the expandable jaws 1 are configured in an area 11 so as to taper radially inwards and so that the recesses 7 and the projections 8 continue in the area 11. In the expanded state, the outer surfaces of the area 11 are in a conical enveloping surface with an opening angle of, for example, 35°, which is indicated by the two broken lines that intersect on the axis "A-A". As a result, sector-shaped front surfaces 12 are delineated with a smaller outer circumference than the outer circumference of the cylindrical surfaces 6. The transitions of the area 11 to the cylindrical surfaces 6 on the one hand and to the front surfaces 12 on the other hand are fully rounded off so as to avoid edge compressions here as well. The round-off sections are indicated in FIG. 3 by families of thin concentric circles with mid-points on the axis "A-A".

FIG. 2 clearly shows that there are only fully rounded-off surfaces on the outside of the zigzag-shaped joints and on the outsides of the projections 8, and FIG. 3 likewise clearly shows that this geometry is retained, even in the maximally expanded state of the expandable jaws 1, and that the notch-shaped groove bed is covered by the stretched material of the hollow body 10, which is shown in the upper half of FIG. 3. Consequently, the inner cross section of the hollow body 10 deviates only to the slightest possible extent from a cylindrical surface, which considerably improves the tightness of a subsequently created pipe connection.

The individual expandable jaws 1 can be advantageously produced by sintering suitable metal particles in a complementary and heated mold.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 expandable jaws
2 flange sectors
3 bores
4 circumferential groove
5 protrusion
6 cylindrical surface
7 recesses
8 projections
9 stop surfaces
10 hollow body
11 tapered area
12 front surfaces
"A-A" axis

The invention claimed is:

1. A device for expanding a hollow body comprising:
a plurality of sector-shaped expandable jaws disposed in a holder and distributed about a central axis, the expandable jaws extending along the axis to a free end and being radially movable with respect to the axis, each of the expandable jaws including:
a cylindrical surface having a radius corresponding to a radius of the hollow body in an expanded state of the hollow body and a cutout from the cylindrical surface so as to form an inward radial taper at an area of the free end;
a plurality of projections and recesses disposed in a joint region between respective ones of the expandable jaws, the projections and recesses being arranged in an alternating manner with each other along the axis and at least partially extending into the area of the free end, the cylindrical surfaces being rounded off so as to transition to respective outer surfaces of the projections and the outer surfaces of the projections extending, at least at ends of the projections, radially inward with respect the cylindrical surfaces.

2. The device according to claim 1, wherein the radius of the hollow body in an expanded state of the hollow body is a radius of a pipe end in an expanded state of the pipe end.

3. The device according to claim 1, wherein each of the expandable jaws includes an edge-free transition from the inward radial taper to the cylindrical surface and is rounded off from the inward radial taper to a front surface of the free end.

4. The device according to claim 1, wherein outer surfaces of the expandable jaws in the area of the free end are configured to form a conical enveloping surface at an end of an expansion stroke.

5. The device according to claim 4, wherein an opening angle of the conical enveloping surface is between 30° and 45°.

6. The device according to claim 5, wherein a length of each inward radial taper in the area of the free end is between 3 mm and 30 mm.

7. The device according to claim 1, wherein the transition from the cylindrical surfaces to the respective outer surfaces of the projections is at a radius of curvature of at least 1 mm.

8. A method of using a device for expanding a hollow body comprising:
providing a plurality of sector-shaped expandable jaws disposed in a holder and distributed about a central axis, the expandable jaws extending along the axis to a free end and being radially movable with respect to the axis, each of the expandable jaws including:
a cylindrical surface having a radius corresponding to a radius of the hollow body in an expanded state of the hollow body and a cutout from the cylindrical surface so as to form an inward radial taper at an area of the free end;
a plurality of projections and recesses disposed in a joint region between respective ones of the expandable jaws, the projections and recesses being arranged in an alternating manner with each other along the axis and at least partially extending into the area of the free end, the cylindrical surfaces being rounded off so as to transition to respective outer surfaces of the projections and the outer surfaces of the projections extending, at least at ends of the projections, radially inward with respect the cylindrical surfaces, and
expanding, by the expandable jaws, a pipe end of a plastic pipe having a shape memory.

* * * * *